United States Patent [19]

Kronich

[11] Patent Number: 4,741,303

[45] Date of Patent: May 3, 1988

[54] COMBINATION COUNTERBALANCE AND OIL SLINGER FOR HORIZONTAL SHAFT ENGINES

[75] Inventor: Peter G. Kronich, Sheboygan, Wis.

[73] Assignee: Tecumseh Products Company, Tecumseh, Mich.

[21] Appl. No.: 918,503

[22] Filed: Oct. 14, 1986

[51] Int. Cl.[4] ................. F02B 75/06; F01M 9/06
[52] U.S. Cl. ............... 123/192 B; 123/196 R; 184/11.1
[58] Field of Search .......... 123/192 R, 192 B, 196 R; 184/6.5, 6.6, 11.1, 11.2, 13.1

[56] References Cited

U.S. PATENT DOCUMENTS

| | | |
|---|---|---|
| 781,066 | 1/1905 | Hewitt . |
| 1,163,832 | 12/1915 | Lanchester . |
| 1,181,312 | 5/1916 | Huff . |
| 1,237,432 | 8/1917 | White . |
| 1,262,798 | 4/1918 | Huebotter . |
| 1,270,606 | 6/1918 | Ducorron . |
| 1,291,157 | 1/1919 | Robson ................. 184/11.1 |
| 1,506,553 | 8/1924 | Baldwin . |
| 1,569,404 | 1/1926 | Smith . |
| 1,583,099 | 5/1926 | Rayfield . |
| 1,595,785 | 8/1926 | Jackson . |
| 1,687,395 | 10/1928 | Shew . |
| 1,898,459 | 2/1933 | Newcomb . |
| 2,023,535 | 12/1935 | Mayo et al. . |
| 2,061,396 | 11/1936 | Dehn et al. . |
| 2,137,220 | 11/1938 | Aikman . |
| 2,523,764 | 9/1950 | Jodry . |
| 2,914,964 | 12/1959 | Bensinger et al. . |
| 2,918,210 | 12/1959 | Touborg . |
| 3,144,097 | 8/1964 | Ebert . |
| 3,415,237 | 12/1968 | Harkness . |
| 4,426,964 | 1/1984 | Umeda et al. . |
| 4,480,607 | 11/1984 | Tsai et al. ............... 123/192 B |
| 4,509,378 | 4/1985 | Brown . |
| 4,513,702 | 4/1985 | Koga et al. . |
| 4,569,316 | 2/1986 | Suzuki . |

FOREIGN PATENT DOCUMENTS 211361  5/1956  Australia .
265241  9/1912  Fed. Rep. of Germany .

Primary Examiner—Michael Koczo
Attorney, Agent, or Firm—Jeffers, Hoffman & Niewyk

[57] ABSTRACT

A combination counterbalancing and oil slinger mechanism located in the sump of a horizontal shaft internal combustion engine having two slinger counterweights radially connected on a slinger shaft. As the counterbalancing oil slinger rotates, it both counterbalances the inertial forces created by the moving parts of the engine and also lubricates the same moving parts by throwing lubricating fluid towards them. A deflector situated partially above the counterbalancing oil slinger directs the lubricating fluid towards the critical bearing points of the moving parts. A restricting wall in the engine sump controls the quantity of lubricating fluid flowing into the oil slinger well.

22 Claims, 5 Drawing Sheets

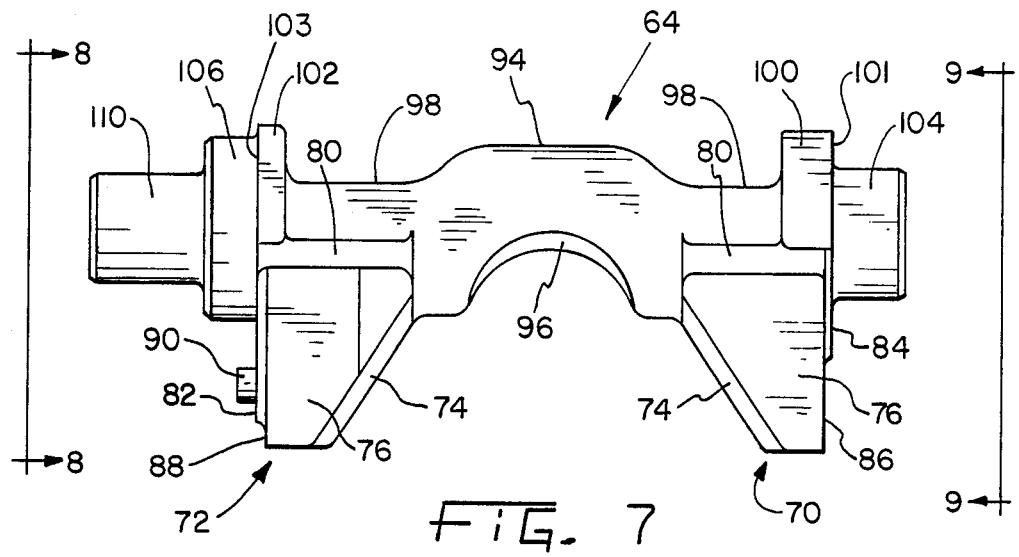
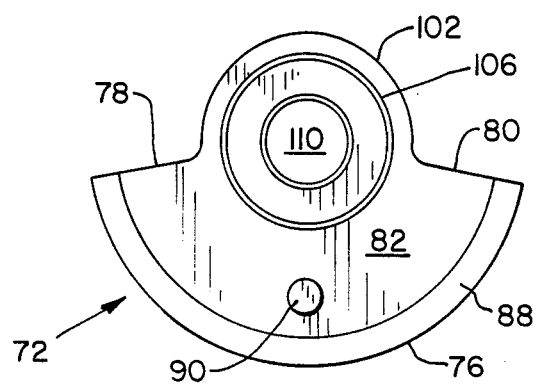
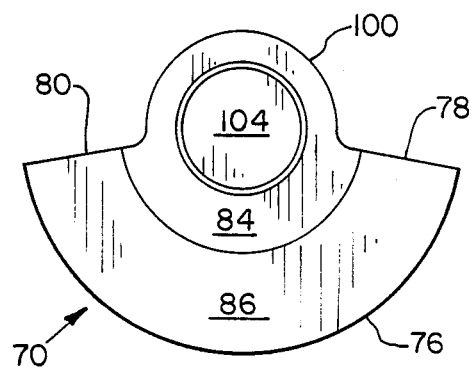
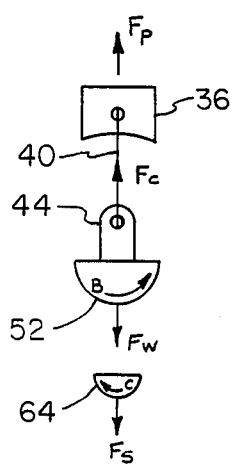
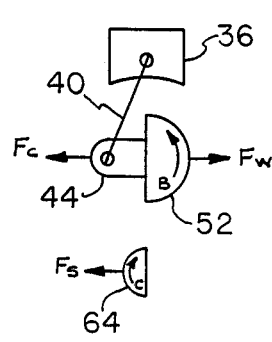
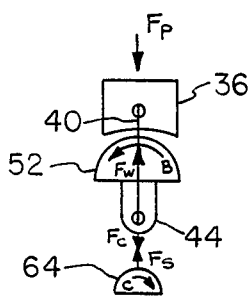
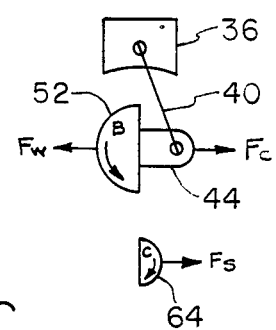

COMBINATION COUNTERBALANCE AND OIL SLINGER FOR HORIZONTAL SHAFT ENGINES

BACKGROUND OF THE INVENTION

The present invention relates to internal combustion engines and, more particularly, to a single mechanism which both counterbalances and lubricates the moving parts within the internal combustion engine.

In the past, various types of connecting rod dipper lubrication systems have been utilized for lubricating the internal components of engines. The dipper lubrication systems generally work by the dipper coming in contact with the lubricating fluid located in the sump of the engine and, thereafter, throwing the fluid as the dipper rotates with the crankshaft. These systems, however, generally tend to throw lubricating fluid in the plane defined by the rotation of the dipper rather than toward the gear train and main bearings where lubrication is needed. Furthermore, dipper systems tend to be very sensitive to the level of oil within the engine sump because, as the oil level decreases, the dipper does not come in contact with the lubricating fluid and, thus, is incapable of throwing oil upwardly toward the moving parts. Further yet, dipper systems are very sensitive to engine tilt because, as the engine tilts, the lubricating fluid tends to flow to one side of the engine sump and away from the point of where the dipper can contact the lubricating fluid. Thus, when the engine is tilted, inadequate lubrication may occur.

To eliminate some of the problems associated with the dipper lubrication systems, rotating slingers have been provided in the engine sump whereby lubricating fluid is thrown upwardly toward the moving parts. However, such rotating slingers are rotationally balanced and do not contribute toward balancing the reciprocating and rotating crankshaft and piston masses in the engine.

Various counterbalancing systems have been used as disclosed in U.S. Pat. Nos. 1,898,459 and 1,595,785 with respect to multiple piston engines. These systems, however, have been generally utilized only for counterbalancing purposes and have not significantly enhanced lubrication.

Although dipper-type splash lubrication systems are commonly used, it is very difficult to use such a system in an engine employing a single rotating counterweight counterbalancer because a single shaft counterbalancer must be located below the crank and in line with the bore and reciprocating mass for attaining an optimum counterbalancing effect. This places the rotating counterweight into the plane of rotation of the crankshaft and, thus, prevents the use of a connecting rod mounting dipper as presently used in splash lubrication types of engines.

SUMMARY OF THE INVENTION

The objects of the invention are obtained, in a preferred form of the invention, by a combination counterbalancing and oil slinger mechanism located in the sump of an internal combustion engine. Two slinger counterweights are radially connected to a counterweight shaft which is connected by gears to the crankshaft of the engine. The counterbalancing oil slinger rotates in the same rotational speed and in the opposite direction as the crankshaft such that the slinger counterweights and the crankshaft counterweights are directionally aligned when the piston of the engine is located at substantially top dead center and bottom dead center. Thus, by locating the counterbalancing oil slinger in the engine sump substantially vertically in line below the piston and the crankshaft and, further, by its being parallel to the crankshaft, the counterbalancing oil slinger both counterbalances the inertial forces created by the moving parts and also lubricates the engine by throwing lubricating fluid toward the critical bearing points and cylinder bore.

The invention also provides a deflector situated partially above the counterbalancing oil slinger whereby lubricating fluid, which is thrown by the slinger, is directed more specifically toward the critical bearing points of the moving parts and cylinder bore rather than merely randomly toward the internal parts of the combustion engine.

Further, a restricting wall is provided in the engine sump whereby the sump is divided into a splash well and a reservoir sump. An opening or restricting gap is provided in the restricting wall such that a controlled quantity of lubricating fluid flows from the reservoir sump into the splash well. As the counterbalancing oil slinger rotates, the lubricating fluid level within the splash well remains below the level of the reservoir sump with the leakage into the splash well being controlled by the restricting gap opening between the oil slinger gear and the restricting wall. Accordingly, over lubrication and excess oil in suspension is prevented, thereby also preventing high oil temperatures and over lubrication of the internal engine components. Further, the restricting wall prevents foaming of the lubricating fluid located within the engine sump.

The counterbalancing and lubricating mechanism of the present invention is less sensitive to the level of lubricating fluid within the engine sump than single point dipper lubrication systems. Although the lubricating fluid within the engine sump may be low or high, the deflector and restricting wall tend to keep the level of lubricating fluid within the splash well at a substantially constant level and, thus, the amount of lubrication generally remains constant regardless of the lubricating fluid level within the engine sump. Furthermore, a constant level of lubricating fluid within the splash well is generally also retained regardless of the engine speed and, therefore, the internal engine components are not over or under lubricated as the engine speed increases or decreases.

The counterbalancing and lubricating mechanism of the present invention effectively lubricates the internal engine components by locating the oil slinging faces on the counterweights, outboard from the bore and piston, closer to the main bearings and also beneath the crankshaft counterweights. Thus, the slinging faces, in combination with the deflector, direct lubricating fluid at the rotational components of the engine including the crankshaft counterweights whereby the lubricating fluid is further dispersed toward the bore and piston surfaces.

Further yet, because the rotating counterweight slinging faces remain perpendicular to the crankshaft whenever the engine is tilted in the plane of rotation, effective lubrication continues to occur during the tilted position because one of the oil slinging faces will always remain submerged within lubricating fluid. Accordingly, the present invention provides generally effective lubrication when the engine is tilted in the plane of rotation as compared with single point dipper lubrication systems having a single connecting rod dipper or splasher centrally located within the sump.

In one form thereof, the present invention relates to an internal combustion engine having a crankcase and moving parts therein including a piston, a connecting rod pivotally connected to the piston, a substantially horizontally disposed rotatable crankshaft pivotally connected to the connecting rod, and a crankshaft counterweight connected to the crankshaft. A lubricating fluid sump is provided below the moving parts for retaining therein lubricating fluid. A counterbalancing and lubricating mechanism is provided including an eccentric member rotatably mounted substantially parallel to the crankshaft in the sump and substantially vertically in line below the piston and crankshaft. The eccentric member is disposed in the sump. The crankshaft rotatably drives the eccentric member in counterrotation to the crankshaft so as to balance the forces created by the moving parts. The eccentric member includes a slinger for throwing lubricating fluid from the sump towards the moving parts.

In one form thereof, the present invention relates to an internal combustion engine including a crankcase and having moving parts therein including a piston, a connecting rod pivotally connected to the piston, a substantially horizontally disposed rotatable crankshaft pivotally connected to the connecting rod and a crankshaft counterweight on the crankshaft. A lubricating fluid sump is provided below the moving parts for retaining therein lubricating fluid. A counterbalancing and lubricating mechanism is provided including an oil slinger which includes a slinger shaft and an eccentric slinger counterweight connected radially outwardly on the slinger shaft. The oil slinger is rotatably mounted substantially parallel to the crankshaft in the sump and substantially vertically in line below the piston and crankshaft. The crankshaft rotatably drives the oil slinger in counterrotation to the crankshaft so as to balance the forces created by the moving parts and to cause the slinger counterweight to throw lubricating fluid from the sump upwardly as the slinger counterweight rotates. A deflector is also provided partially positioned above the sump for directing thrown lubricating fluid towards the moving parts and cylinder bore.

In one form thereof, the present invention relates to an internal combustion engine having moving parts including a piston, a connecting rod pivotally connected to the piston, a substantially horizontally disposed rotatable crankshaft pivotally connected to the connecting rod, and a crankshaft counterweight connected to the crankshaft. A lubricating fluid sump is provided below the moving parts for retaining therein lubricating fluid. A counterbalancing and lubricating apparatus is provided including an oil slinger having a slinger shaft and a slinger counterweight connected radially onto the slinger shaft. The oil slinger is rotatably mounted substantially parallel to the crankshaft in the sump and substantially vertically in line below the piston and crankshaft. The crankshaft rotatably drives the oil slinger in counterrotation to the crankshaft to balance forces created by the moving parts and to cause the slinger counterweight to throw lubricating fluid from the sump radially outwardly as the slinger counterweight rotates. The quantity of lubricating fluid which comes in contact with the eccentric member is restricted and, thus, the quantity of lubricating fluid which is thrown by the oil slinger is also restricted.

It is the principle object of the invention to overcome the above-discussed disadvantages associated with earlier internal combustion engines utilizing various lubricating and counterbalancing systems. It is further the object of this invention to overcome those disadvantages in an efficient and inexpensive manner.

BRIEF DESCRIPTION OF THE DRAWINGS

The above-mentioned and other features and objects of this invention and the manner of obtaining them will become more apparent and the invention itself will be better understood by reference to the following description of an embodiment of the invention taken in conjunction with the accompanying drawings wherein:

FIG. 7 is an elevational view of the counterbalancing oil slinger shown in the engine of FIG. 1;

FIG. 8 is an end view of the counterbalancing oil slinger along line 8—8 of FIG. 7;

FIG. 9 is an end view of the counterbalancing oil slinger along line 9—9 of FIG. 7;

FIGS. 10a–10d are diagrammatic views of the piston, crankarm, crankshaft counterweights, and slinger counterweights shown in various positions during a rotating cycle and also showing the inertial forces associated therewith;

Corresponding reference characters indicate corresponding parts throughout the several views of the drawings.

The exemplifications set out herein illustrate a preferred embodiment of the invention in one form thereof and such exemplifications are not to be construed as limiting the scope of the disclosure or the scope of the invention in any manner.

DETAILED DESCRIPTION OF A SPECIFIC EMBODIMENT

Figures 1, 6:
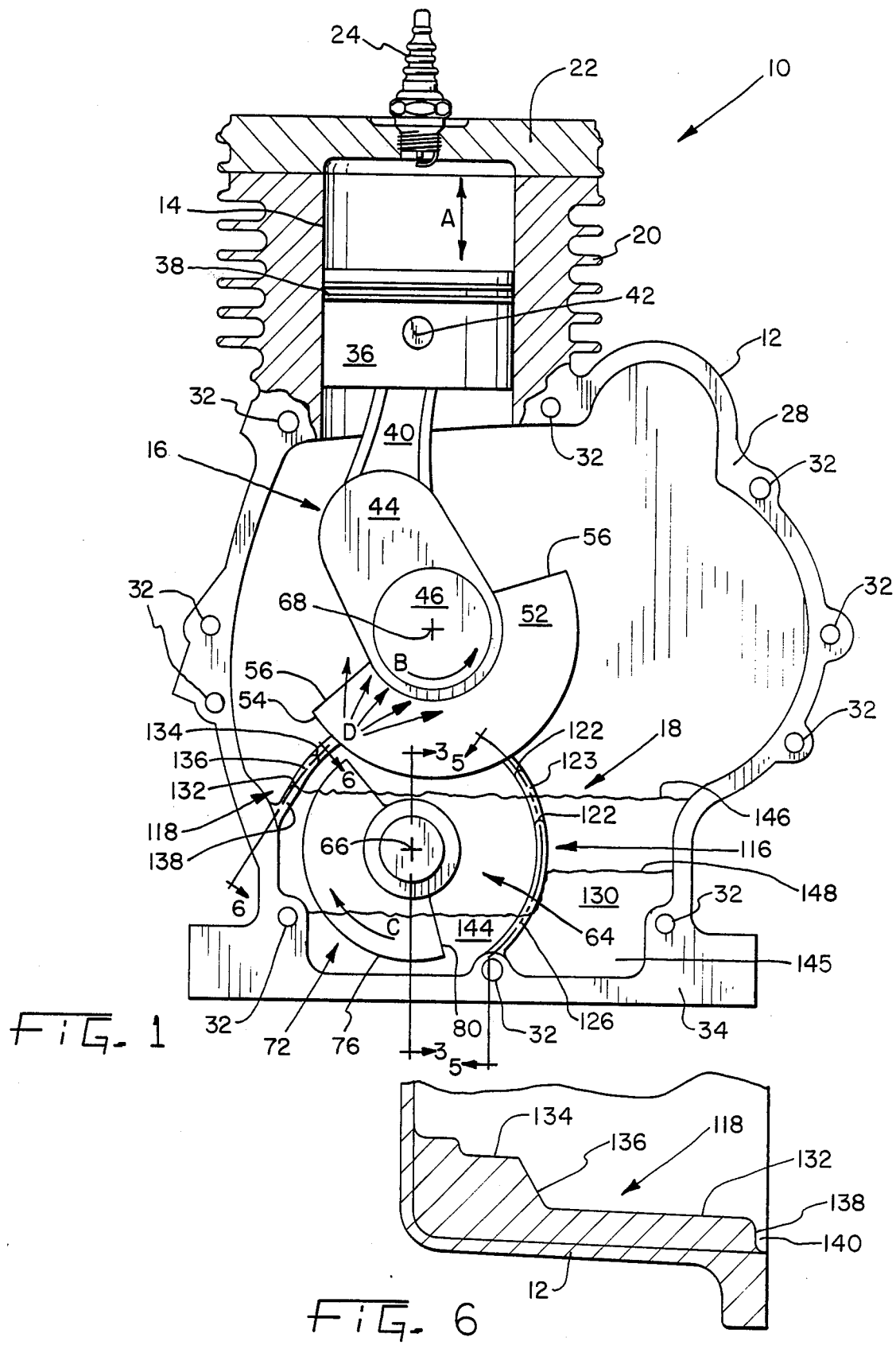
FIG. 1 is a cut-away elevational side view of a preferred embodiment of an internal combustion engine including the present invention.
FIG. 6 is a cross sectional view of the deflector wall taken along line 6—6 of FIG. 1.

As shown in FIG. 1, a specific embodiment of the present invention is incorporated in an internal combustion engine generally indicated as 10. Engine 10 includes a die cast crankcase 12 which defines combustion cylinder 14, a crank chamber generally indicated as 16 and lower sump portion 18. Cylinder 14 is provided with cooling fins 20. Head 22 is mounted to crankcase 12 by screws in a known and customary fashion (not shown), and sparkplug 24 is threadably connected to head 22.

Crankcase 12 is die cast having a flat rim 28 to which is mounted cover 30 (FIGS. 2, 3 and 11), by screws which are received within threaded holes 32. Crankcase base 34 is provided with mounting holes 35 which are used to mount engine 10 in a customary fashion on a reel mower deck (not shown) or other implements.

Within combustion cylinder 14 there is slidably received, for reciprocating motion, piston 36 having piston ring 38 retained thereon to provide a sliding seal. Piston 36 is pivotally connected to connecting rod 40 by piston pin 42 and connecting rod 40 is pivotally connected to crankarm 44 of crankshaft 46. Crankshaft 46 is rotatably mounted between crankcase 12 and crankcase cover 30 as more clearly shown in FIG. 2. Thus, as piston 36 reciprocates in the directions indicated by arrows A, crankshaft 46 is rotated about its axis as indicated by arrow B.

Figure 2:
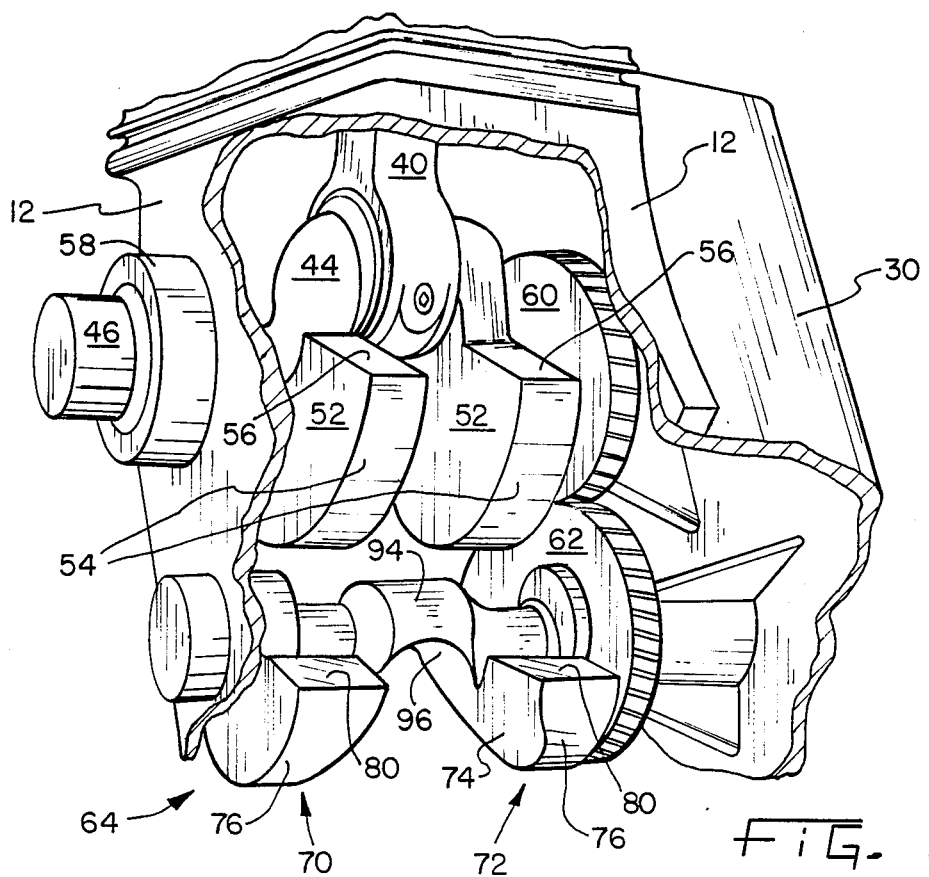
FIG. 2 is a cut-away perspective view showing the counterbalancing oil slinger coupled to the crankshaft of the engine shown in FIG. 1.

As shown in FIG. 2, integral crankshaft counterweights 52 are located on each side of the pivotal connection between connection rod 40 and crankarm 44. Further, as shown in FIG. 1, crankshaft counterweights 52 are centered in line with crankshaft axis 68 and with crankarm 44. Crankshaft counterweights 52 are semicircular having outer circumferential sides 54 and radial sides 56. Referring now to FIG. 2, crankshaft 46 is shown rotatably mounted, at one end thereof, within cylindrical sleeve portion 58 of crankcase 12 on the power take off side of the engine. At the other end of crankshaft 46, opposite the power take off side of the engine near crankcase cover 30, crankshaft gear 60 is mounted upon crankshaft 46 and rotates therewith. Gear 60 meshes with oil slinger gear 62 which, in turn, is coaxially connected to counterbalancing oil slinger 64.

Counterbalancing oil slinger 64, as shown in FIGS. 1 and 2, is rotatably mounted between crankcase 12 and crankcase cover 30, generally vertically in line below cylinder 14 and crankshaft 46. Counterbalancing oil slinger axis 66 is parallel to crankshaft axis 68.

Gears 60 and 62 are the same diameter so that counterbalancing oil slinger 64 rotates at the same rotational speed as crankshaft 46, but in opposite rotational direction as indicated by arrow C in FIG. 1. It should be understood that other arrangements for coupling crankshaft 46 and counterbalancing oil slinger 64 can be used to as to retain the same rotational speed in the opposite direction between crankshaft 46 and counterbalancing oil slinger 64, such as timing chains and belts and various other gearing systems.

Counterbalancing oil slinger 64 has connected integrally therewith counterweight 70 located near the power take off side of engine 10 and counterweight 72 located near the crankcase cover side of engine 10. Counterweights 70 and 72 each have partial frusto-conical sides 74, semi-circular circumferential sides 76, leading or oil slinger faces 78 and trailing faces 80. Faces 78 and 80 extend radially outwardly from counterbalancing oil slinger axis 66. Counterweight 70 has a raised semi-circular hub portion 84 (FIG. 7) surrounded by a recessed rim portion 86. Counterweight 72 has a raised semi-circular hub portion 82 surrounded by a recessed rim portion 88. Portion 82 has integral therewith a protrusion 90 that is received within hole 92 in gear 62 to thereby key gear 62 and slinger 64 together. It should be understood that other means of connecting gear 62 and counterbalancing oil slinger 64 are available.

The axial shaft portion of counterbalancing oil slinger 64 includes an offset center portion 94 and recess 96 between slinger counterweight portions 70 and 72. Valley portions 98 are also located on the axial shaft of oil slinger 64 on each side of offset center portion 94.

Figure 3:
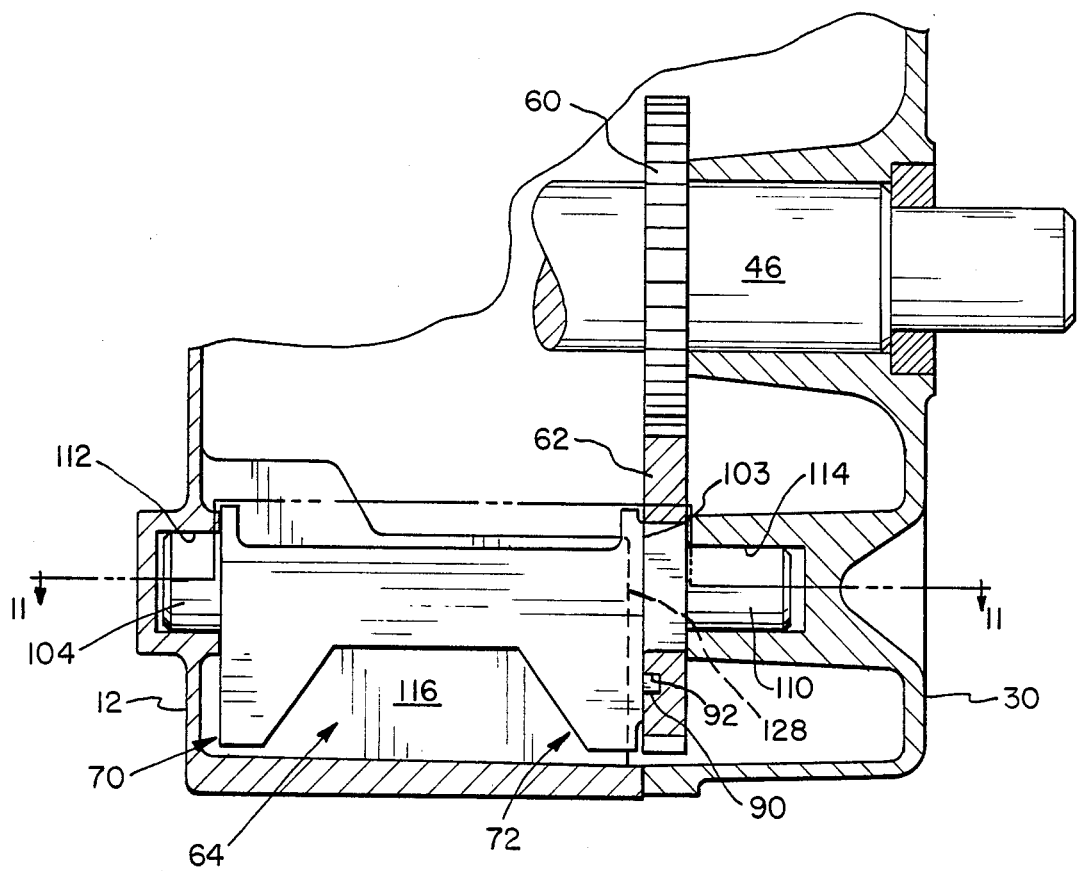
FIG. 3 is a cross sectional view taken along line 3—3 of FIG. 1 with the crankcase cover connected to the crankcase.

Shoulder 100 includes a surface 101 coplanar to the surface of hub portion 84 and bears against crankcase 12. Shoulder 102 includes surface 103 that supports gear 62 (FIG. 3). Shoulder 106 is received within bore 108 of gear 62.

Figure 4:
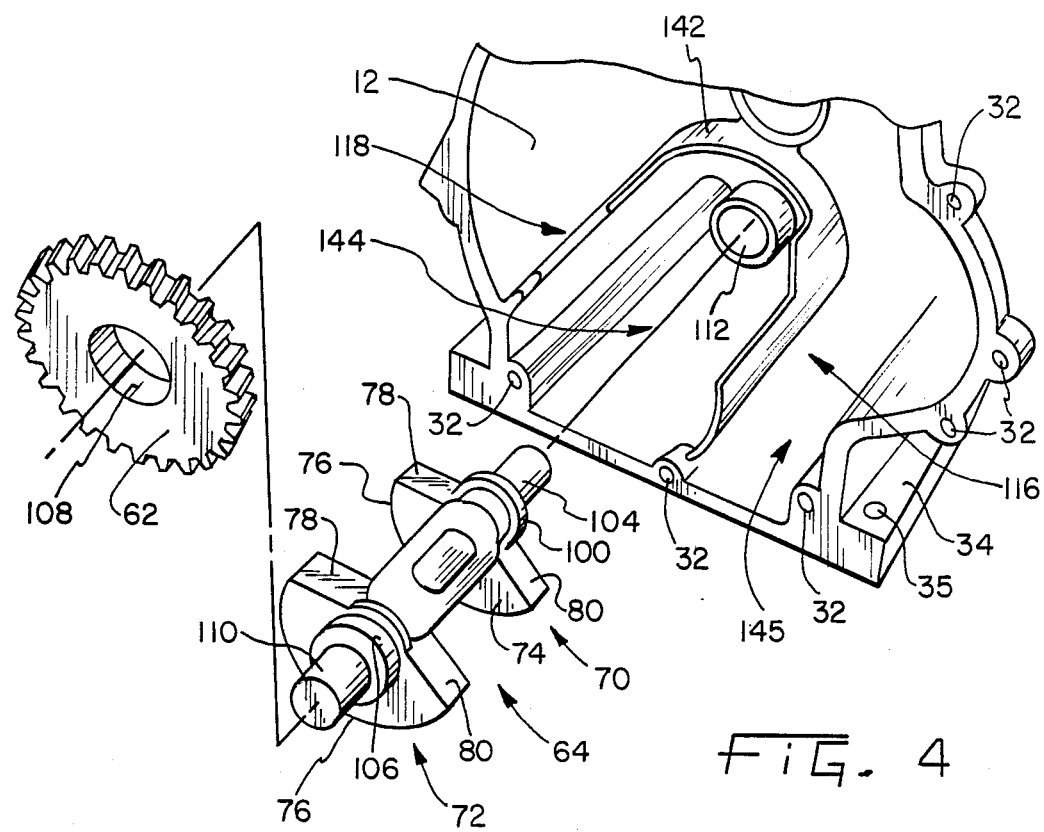
FIG. 4 is a fragmentary perspective exploded view of the engine shown in FIG. 1 showing the counterbalancing oil slinger and gear.

As shown in FIGS. 3 and 4, power take off side stub shaft portion 104 is received within bore 112 in crankcase 12. At the other end of counterbalancing oil slinger 64, stub shaft portion 110 is received within bore 114 of crankcase cover 30. Thus, counterbalancing oil slinger 64 is rotatably mounted between the power take off side of engine 10 and crankcase cover 30.

Figure 5:
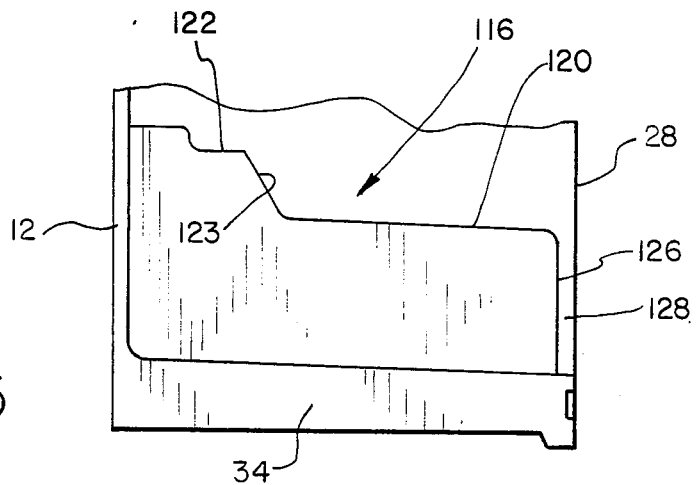
FIG. 5 is a cross sectional view of the sump restricting wall taken along line 5—5 of FIG. 1.
Figure 11:
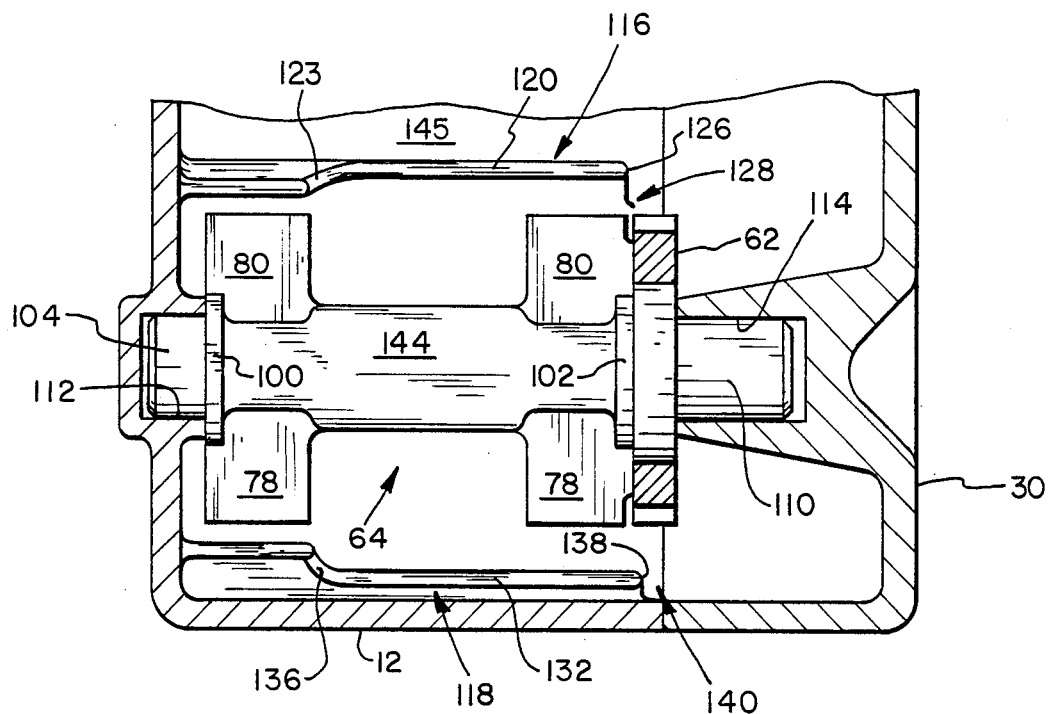
FIG. 11 is a top plan view of the counterbalancing oil slinger, deflector wall, and the sump restricting wall taken in the direction of line 11—11 of FIG. 3.

As shown in FIGS. 1 and 4, counterbalancing oil slinger 64 is generally located in the lower sump portion 18 of crankcase 12 and is partially radially enclosed by a restricting member or oil barrier 116, a portion of crankcase base 34, a portion of the side of crankcase 12 and by oil deflector 118. Restricting oil barrier 116, as shown in FIGS. 1 and 5, is concave-shaped having a lower top edge 120 and an upper top edge 122 joined by an intermediate edge 123. One end of barrier 116 is joined to crankcase 12, and the bottom end thereof is joined to crankcase base 34. Barrier 116 has a vertical edge 126 on the crankcase cover side of engine 10 which is spaced from crankcase cover 30 and gear 62, thus forming a restricting opening or gap 128 therebetween (FIGS. 3, 5, and 11). As shown in FIG. 1, lubricating fluid 130, such as oil, located within reservoir sump portion 145, is allowed to travel through restricting gap 128 towards counterbalancing oil slinger 64.

Oil deflector 118, as shown in FIGS. 1 and 6, also has a lower top edge 132 and an upper top edge 134 joined by intermediate edge 136. Deflector 118 is concave-shaped and also has a substantially vertical edge 138 spaced from crankcase cover 30 to form an opening or gap 140. Gap 140 allows lubricating fluid flowing downwardly along the side of crankcase 12 to flow into the lower portion of slinger sump or well 144.

As more clearly shown in FIG. 4, restricting oil barrier 116 and deflector 118 are joined by cover portion 142.

In operation, counterbalancing oil slinger 64 acts to both provide lubricating fluid to the internal moving parts of engine 10 and to also counterbalance the forces created by the piston and crankshaft assembly. As an oil slinger, counterbalancing oil slinger 64 rotates as indicated by arrow C and faces 78 throw lubricating fluid 130 up and out of slinger well 144. Deflector 118 is situated such that lubricating fluid 130, which is being thrown by faces 78, is thrown out of well 144 toward crankshaft 46 and piston 36 as indicated by arrows D (FIG. 1). It should be noted that lubricating fluid 130 coming in contact with the other portions of counterbalancing oil slinger 64 is also thrown upwardly due to the centrifugal force created by the rotation of counterbalancing oil slinger 64. Furthermore, faces 78 also throw lubricating fluid toward crankshaft counterweights 52 which, by their rotation, also cause the lubricating fluid coming in contact therewith to be thrown in various other directions so that further lubrication may occur. Thus, lubricating fluid 130 efficiently reaches all the moving parts within crankcase 12.

The quantity of lubricating fluid 130, which is thrown out of slinger well 144, and its direction, is controlled by properly locating top edges 122 and 132 and by properly sizing restricting gaps 128 and 140. Prior to start up, most of lubricating fluid 130 is located in both reservoir sump 145 and slinger well 144 as indicated by lubricating fluid line 146 (FIG. 1). As soon as engine 10 is started, the lubricating fluid within slinger well 144 is rapidly thrown upwardly towards the moving parts. Thus, the oil level within reservoir sump 145 is lowered to an equilibrium level indicated by line 148. This equilibrium level is reached when the amount of lubricating fluid discharged from slinger well 144 equals the amount of lubricating fluid which is entering slinger well 144. The amount of lubricating fluid which enters slinger well 144 is controlled by properly sizing restricting gaps 128 and 140. Further, top edge 122 must be sufficiently high so as to not allow lubricating fluid to flow thereover during normal operating conditions. Further yet, the direction in which lubricating fluid is thrown is controlled by deflector 118.

Counterbalancing oil slinger 64 also balances the inertial forces created by the moving parts within engine 10. As schematically shown in FIGS. 10a–10d, piston 36 and connecting rod 40 create an inertial force $F_p$, crank arm 44 and connecting arm 40 create an inertial force $F_c$, crankshaft counterweights 52 create an inertial force $F_w$, and counterbalancing oil slinger 64 creates an inertial force $F_s$. The inertial force of $F_c$, $F_w$ and $F_s$ are constant for a given rotational speed and are, further, always directed radially outwardly from the respective rotational axis. The reciprocating force $F_p$ is directed vertically upwardly or vertically downwardly depending on the motion of piston 36.

It can be seen that in FIGS. 10a and 10c, showing the top dead center and bottom dead center piston positions, respectively, $F_w$ and $F_s$ are directionally aligned while $F_p$ and $F_c$ are directionally aligned. Further, in the intermediate piston positions shown in FIGS. 10b and 10d, $F_c$ and $F_s$ are directionally opposite of $F_w$. In this fashion, rotational forces $F_c$, $F_w$ and $F_s$, along with reciprocating force $F_p$ substantially counterbalance each other at all times such that combustion engine 10 is generally prevented from vibrating. In essence, the rotational offset mass of counterbalancing oil slinger 64 is used to balance the 50 percent of the reciprocating mass of piston 36 and connecting rod 40 not compensated for by crankshaft counterweights 52, which balance 100 percent of the rotational mass and 50 percent of the reciprocating mass.

To minimize the size of crankcase 12 and to also maximize the effect of the counterbalancing, oil slinger 64 is positioned as close as possible to crankshaft 46. In this regard, as crankshaft 46 and counterbalancing oil slinger 64 rotate, when counterweights 52 are at bottom dead center, counterweights 70 and 72 are also at bottom dead center. In this position, counterweights 52 nest with valley portions 98 of oil slinger 64. Further, when crankarm 44 is at bottom dead center, slinger counterweights 70 and 72 and recess 96 of counterbalancing oil slinger 64 are at top dead center and nest with crankarm 44 and connecting rod 40. As can be appreciated, recess 96 permits counterbalancing oil slinger 64 to be positioned as close as possible to crankshaft 46 thereby minimizing the size of crankcase 12 and maximizing the slinging of oil toward the moving parts in crankcase 12.

While the invention has been described as having a specific embodiment, it will be understood that it is capable of further modifications. This application is, therefore, intended to cover any variations, uses or adaptations of the invention following the general principles thereof and including such departures from the present disclosure as come within known or customary practice in the art to which this invention pertains and fall within the limits of the appended claims.

What is claimed is:

1. In an internal combustion engine including a crankcase having moving parts therein including a piston, a connecting rod pivotally connected to said piston, a substantially horizontally disposed rotatable crankshaft pivotally connected to said connecting rod, and a crankshaft counterweight connected to said crankshaft, and a lubricating fluid sump below said moving parts, a counterbalancing and lubricating mechanism comprising:

lubricating fluid in said sump;

an eccentric member rotatably mounted substantially parallel to said crankshaft in said sump and substantially vertically in line below said piston and said crankshaft, said eccentric member being disposed in said sump;

drive means coupling together said crankshaft and said eccentric member for rotatably driving said eccentric member in counterrotation to said crankshaft to balance forces created by said moving parts, said eccentric member including slinger means thereon for throwing lubricating fluid from the sump towards said moving parts;

wherein said lubricating fluid is at a level vertically below the highest rotational point of said slinger means during operation of said engine; and, deflector means extending at least partially above the level of the lubricating fluid and being at least partially positioned above said eccentric member for directing thrown lubricating fluid towards said moving parts.

2. The counterbalancing and lubricating mechanism of claim 1 wherein said slinger means comprises a slinger face extending substantially radially outwardly from the axis of said eccentric member so that as said face rotates with said eccentric member said face dips into lubricating fluid in the sump and throws lubricating fluid from the sump towards said moving parts.

3. The counterbalancing and lubricating mechanism of claim 2 wherein said eccentric member comprises:

a slinger shaft portion;

a slinger counterweight portion extending radially from said shaft portion; and wherein said slinger face is located on said slinger counterweight portion.

4. The counterbalancing and lubricating mechanism of claim 1 wherein said drive means includes a crankshaft gear axially connected to said crankshaft and a slinger gear having substantially the same diameter as said crankshaft gear axially connected to said eccentric member and, wherein said crankshaft gear and said slinger gear are coupled together so that said eccentric member rotates at substantially the same rotational speed as said crankshaft and in opposite direction thereof and so that said eccentric member and said crankshaft counterweight are directionally aligned at substantially top dead center and bottom dead center piston positions.

5. In an internal combustion engine including a crankcase having moving parts therein including a piston, a connecting rod pivotally connected to said piston, a substantially horizontally disposed rotatable crankshaft pivotally connected to said connecting rod, and a crankshaft counterweight connected to said crankshaft, and a lubricating fluid sump below said moving parts for retaining therein lubricating fluid, a counterbalancing and lubricating mechanism comprising:

an eccentric member rotatably mounted substantially parallel to said crankshaft in said sump and substantially vertically in line below said piston and said crankshaft, said eccentric member being disposed in said sump;

drive means coupling together said crankshaft and said eccentric member for rotatably driving said eccentric member in counterrotation to said crankshaft to balance forces created by said moving parts, said eccentric member including slinger means thereon for throwing lubricating fluid from the sump towards said moving parts; and, restriction means in said sump for controlling the quantity of lubrication fluid which comes in contact with said slinger means.

6. The counterbalancing and lubricating mechanism of claim 5 wherein said restriction means includes a barrier in said sump dividing said lubricating fluid sump into a slinger sump portion and a reservoir sump portion, said barrier defining an opening through which lubricating fluid in said reservoir sump portion flows into said slinger sump portion.

7. The counterbalancing and lubricating mechanism of claim 6 wherein said barrier is integral with said crankcase and wherein said opening is a gap between said barrier and the crankcase.

8. In an internal combustion engine including a crankcase having moving parts therein including a piston, a connecting rod pivotally connected to said piston, a substantially horizontally disposed rotatable crankshaft pivotally connected to said connecting rod, and a crankshaft counterweight connected to said crankshaft, and a lubricating fluid sump below said moving parts for retaining therein lubricating fluid, a counterbalancing and lubricating mechanism comprising:

an eccentric member rotatably mounted substantially parallel to said crankshaft in said sump and substantially vertically in line below said piston and said crankshaft, said eccentric member being disposed in said sump;

drive means coupling together said crankshaft and said eccentric member for rotatably driving said eccentric member in counterrotation to said crankshaft to balance forces created by said moving parts, said eccentric member including slinger means thereon for throwing lubricating fluid from the sump towards said moving parts; and, deflector means at least partially positioned above said eccentric member and connected to the crankcase for directing thrown lubricating fluid towards said moving parts.

9. The counterbalancing and lubricating mechanism of claim 8 wherein said deflector means includes a deflector wall member, said deflector wall defining an opening to permit lubricating fluid above said deflector wall to travel back towards said eccentric member.

10. In an internal combustion engine including a crankcase having moving parts therein including a piston, a connecting rod pivotally connected to said piston, a substantially horizontally disposed rotatable crankshaft pivotally connected to said connecting rod, and a crankshaft counterweight on said crankshaft, and a lubricating fluid sump below said moving parts for retaining therein lubricating fluid, a counterbalancing and lubricating mechanism comprising:

an oil slinger including a slinger shaft and an eccentric slinger counterweight connected radially outwardly on said slinger shaft, said oil slinger rotatably mounted substantially parallel to said crankshaft in said sump and substantially vertically in line below said piston and said crankshaft;

drive means coupling together said crankshaft and said oil slinger for rotatably driving said oil slinger in counterrotation to said crankshaft to balance forces created by said moving parts, and to cause said slinger counterweight to throw lubricating fluid upwardly from said sump as said slinger counterweight rotates; and deflector means at least partially positioned above said oil slinger for directing thrown lubricating fluid towards the moving parts.

11. The counterbalancing and lubricating mechanism of claim 10 wherein said slinger counterweight includes a slinger face surface extending substantially radially outwardly from said slinger shaft whereby, as said slinger face surface rotates with said slinger counterweight, said slinger face comes in contact with said lubricating fluid in said sump and throws the lubricating fluid towards the moving parts.

12. The counterbalancing and lubricating mechanism of claim 10 further comprising restriction means in said sump for controlling the quantity of lubricating fluid which comes in contact with said oil slinger and is thrown towards said moving parts.

13. The counterbalancing and lubricating mechanism of claim 12 wherein said restriction means includes a restricting wall in said sump dividing said lubricating fluid sump into a slinger sump portion and a reservoir sump portion, said restricting wall defining an opening through which lubricating fluid in said reservoir sump portion flows into said slinger sump portion.

14. The counterbalancing and lubricating mechanism of claim 13 wherein said restricting wall is integral with the crankcase and wherein said opening is a gap substantially between said restricting wall and the crankcase of said engine.

15. The counterbalancing and lubricating mechanism of claim 10 wherein said deflector means includes a deflector wall member integral with the crankcase, said deflector wall member having an opening whereby lubricating fluid above said deflector wall member travels back towards said oil slinger.

16. The counterbalancing and lubricating mechanism of claim 10 wherein said drive means includes a crankshaft gear axially connected to said crankshaft and a slinger gear having substantially the same diameter as said crankshaft gear axially connected to said oil slinger and coupled with said crankshaft gear, wherein said crankshaft gear and said slinger gear are coupled so that said oil slinger rotates at substantially the same rotational speed as said crankshaft in the opposite direction thereof and so that said slinger counterweight and said crankshaft counterweight are directionally aligned at substantially top dead center and bottom dead center piston positions.

17. In an internal combustion engine including a crankcase having moving parts therein including a piston, a connecting rod pivotally connected to said piston, a substantially horizontally disposed rotatable crankshaft pivotally connected to said connecting rod, and a crankshaft counterweight connected to said crankshaft, and a lubricating fluid sump below said moving parts for retaining therein lubricating fluid, a counterbalancing lubricating apparatus comprising:

an oil slinger including a slinger shaft and a slinger counterweight connected radially onto said slinger shaft, said oil slinger rotatably mounted substantially parallel to said crankshaft in said sump and substantially vertically in line below said piston and said crankshaft;

drive means coupling together said crankshaft and said oil slinger for rotatably driving said oil slinger in counterrotation to said crankshaft to balance forces created by said moving parts, and to cause said slinger counterweight to throw lubricating fluid from said sump radially outwardly as said slinger counterweight rotates; and restricting means connected to said sump for restricting the quantity of lubricating fluid which comes in contact with said slinger counterweight and restricting the quantity of lubricating fluid which is thrown by said slinger counterweight.

18. The counterbalancing and lubricating mechanism of claim 17 wherein said slinger counterweight includes a slinger face extending substantially radially outwardly from said slinger shaft of said oil slinger whereby as said slinger face rotates with said oil slinger, said slinger face contacts said lubricating fluid in said sump and throws said lubricating fluid radially outwardly towards said moving parts.

19. The counterbalancing and lubricating mechanism of claim 17 wherein said restricting means includes a restricting wall connected to said sump dividing said lubricating fluid sump into a slinger sump portion and a reservoir sump portion, said restricting wall having an opening whereby lubricating fluid in said reservoir sump portion flows into said slinger sump portion.

20. The counterbalancing and lubricating mechanism of claim 17 further comprising deflector means at least partially positioned above said oil slinger for directing thrown lubricating fluid towards said moving parts.

21. The counterbalancing and lubricating mechanism of claim 20 wherein said deflector means includes a deflector wall member integral with the crankcase, said deflector wall member having an opening through which lubricating fluid above said deflector wall member travels back towards said oil slinger.

22. The counterbalancing and lubricating mechanism of claim 17 wherein said drive means includes a crankshaft gear axially connected to said crankshaft and a slinger gear having substantially the same diameter as said crankshaft gear axially connected to said oil slinger and coupled with said crankshaft gear, wherein said crankshaft gear and said slinger gear are coupled so that said oil slinger rotates at substantially the same rotational speed as said crankshaft and in opposite direction thereof and so that said slinger counterweight and said crankshaft counterweight are directionally aligned at substantially top dead center and bottom dead center piston positions.

* * * * *